(12) United States Patent
Martens

(10) Patent No.: US 7,553,405 B2
(45) Date of Patent: Jun. 30, 2009

(54) PROCESS TO PREPARE A SYNTHESIS GAS

(75) Inventor: Franciscus Johanna Arnoldus Martens, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/775,554

(22) Filed: Jul. 10, 2007

(65) Prior Publication Data

US 2008/0035890 A1 Feb. 14, 2008

(51) Int. Cl.
*C01B 3/24* (2006.01)
*C07C 27/14* (2006.01)
*C10G 47/00* (2006.01)

(52) U.S. Cl. .................... 208/107; 252/373; 518/703

(58) Field of Classification Search ............... 252/373; 518/703; 208/107
See application file for complete search history.

(56) References Cited

U.S. PATENT DOCUMENTS

| | | | |
|---|---|---|---|
| 3,000,627 A | 9/1961 | Foote, Jr. ................. 269/112 |
| 4,245,696 A | 1/1981 | Van der Lelij .......... 165/134 R |
| 4,789,384 A * | 12/1988 | Martens et al. ............. 48/197 R |
| 4,836,831 A * | 6/1989 | Martens .................... 48/197 R |
| 4,888,031 A * | 12/1989 | Martens .................... 48/197 R |
| 5,628,931 A * | 5/1997 | Lednor et al. ............... 252/373 |
| 5,653,916 A * | 8/1997 | Disselhorst et al. ......... 252/373 |
| 5,883,138 A * | 3/1999 | Hershkowitz et al. ....... 518/703 |
| 5,886,056 A * | 3/1999 | Hershkowitz et al. ....... 518/703 |
| 5,935,489 A * | 8/1999 | Hershkowitz et al. ....... 252/373 |
| 5,980,782 A * | 11/1999 | Hershkowitz et al. ....... 252/373 |
| 6,267,912 B1 * | 7/2001 | Hershkowitz et al. ....... 252/373 |
| 7,008,967 B2 * | 3/2006 | Keyser et al. ............... 518/702 |
| 2001/0051662 A1 | 12/2001 | Arcuri et al. ............... 518/704 |
| 2003/0083391 A1 * | 5/2003 | Jahnke et al. ............... 518/703 |
| 2004/0077736 A1 * | 4/2004 | Steynberg et al. .......... 518/703 |

FOREIGN PATENT DOCUMENTS

| | | |
|---|---|---|
| EP | 111376 | 3/1991 |
| EP | 0297111 | 7/1992 |
| EP | 0522744 | 8/1997 |
| EP | 0774103 | 9/1998 |
| EP | 532118 | 5/1999 |
| EP | 0776959 | 10/2004 |
| GB | 2183672 | 6/1987 |
| WO | WO9306041 | 4/1993 |
| WO | WO9603345 | 2/1996 |
| WO | WO9639354 | 12/1996 |

(Continued)

OTHER PUBLICATIONS

Shell Gasification Process in the Oil and Gas Journal, Sep. 6, 1971, pp. 85-90.

*Primary Examiner*—Wayne Langel

(57) ABSTRACT

A process to prepare a synthesis gas comprising hydrogen and carbon monoxide comprises performing a partial oxidation on a methane comprising feed using a multi-orifice burner provided with an arrangement of separate passages, wherein the gaseous hydrocarbon having an elevated temperature flows through a passage of the burner, an oxidizer gas flows through a separate passage of the burner and wherein the passage for gaseous hydrocarbon feed and the passage for oxidizer gas are separated by a passage through which a secondary gas flows, wherein the secondary gas comprises hydrogen, carbon monoxide and/or a hydrocarbon.

23 Claims, 2 Drawing Sheets

FOREIGN PATENT DOCUMENTS

| | | |
|---|---|---|
| WO | WO9722547 | 6/1997 |
| WO | WO0014179 | 3/2000 |
| WO | WO0238699 | 5/2002 |
| WO | WO03000627 | 1/2003 |
| WO | WO03051769 | 6/2003 |
| WO | WO2004069592 | 8/2004 |
| WO | WO2004092060 | 10/2004 |
| WO | WO2004096952 | 11/2004 |
| WO | WO2005000736 | 1/2005 |
| WO | WO2005015105 | 2/2005 |
| WO | WO2005108336 | 11/2005 |
| WO | WO2006097440 | 9/2006 |

* cited by examiner

PROCESS TO PREPARE A SYNTHESIS GAS

This application claims the benefit of European Application No. 06116941.3 filed Jul. 11, 2006.

FIELD OF INVENTION

The invention relates to a process to prepare a synthesis gas from a methane comprising feed by partial oxidation.

BACKGROUND OF THE INVENTION

GB-A-2183672 discloses a process to prepare a Fischer-Tropsch synthesis product starting from a synthesis gas as prepared from a natural gas. In this process carbon dioxide is removed from the syngas as prepared in a reformer step and recycled to be used in said reformer step.

WO-A-9603345 describes a process to prepare a mixture of carbon monoxide and hydrogen by partial oxidation of natural gas in a co-annular burner using 99.5% pure oxygen and optionally carbon dioxide as moderator gas and in the absence of a catalyst. In Example 7 a natural gas feedstock having a temperature of between 150 and 250° C. is supplied to the outer passage of a three-passage burner. In the centre passage oxygen is supplied having a velocity of 40-60 m/s and in the intermediate passage oxygen flows with a velocity of 100-150 m/s. The temperature in the reactor was between 1300 and 1400° C.

A disadvantage of the above process is that the consumption of oxygen is high.

The present process involves an improved process to prepare a mixture of carbon monoxide and hydrogen wherein the consumption of oxygen is reduced.

SUMMARY OF THE INVENTION

The present invention provides a process to prepare a synthesis gas comprising hydrogen and carbon monoxide by performing a partial oxidation on a methane comprising feed using a multi-orifice burner provided with an arrangement of separate passages, wherein the gaseous hydrocarbon having a temperature above 500° C. flows through a passage of the burner, an oxidizer gas flows through a separate passage of the burner and wherein the passage for gaseous hydrocarbon feed and the passage for oxidizer gas are separated by a passage through which a secondary gas flows, wherein the secondary gas comprises hydrogen, carbon monoxide and/or a hydrocarbon.

DETAILED DESCRIPTION OF THE INVENTION

Figure 1:
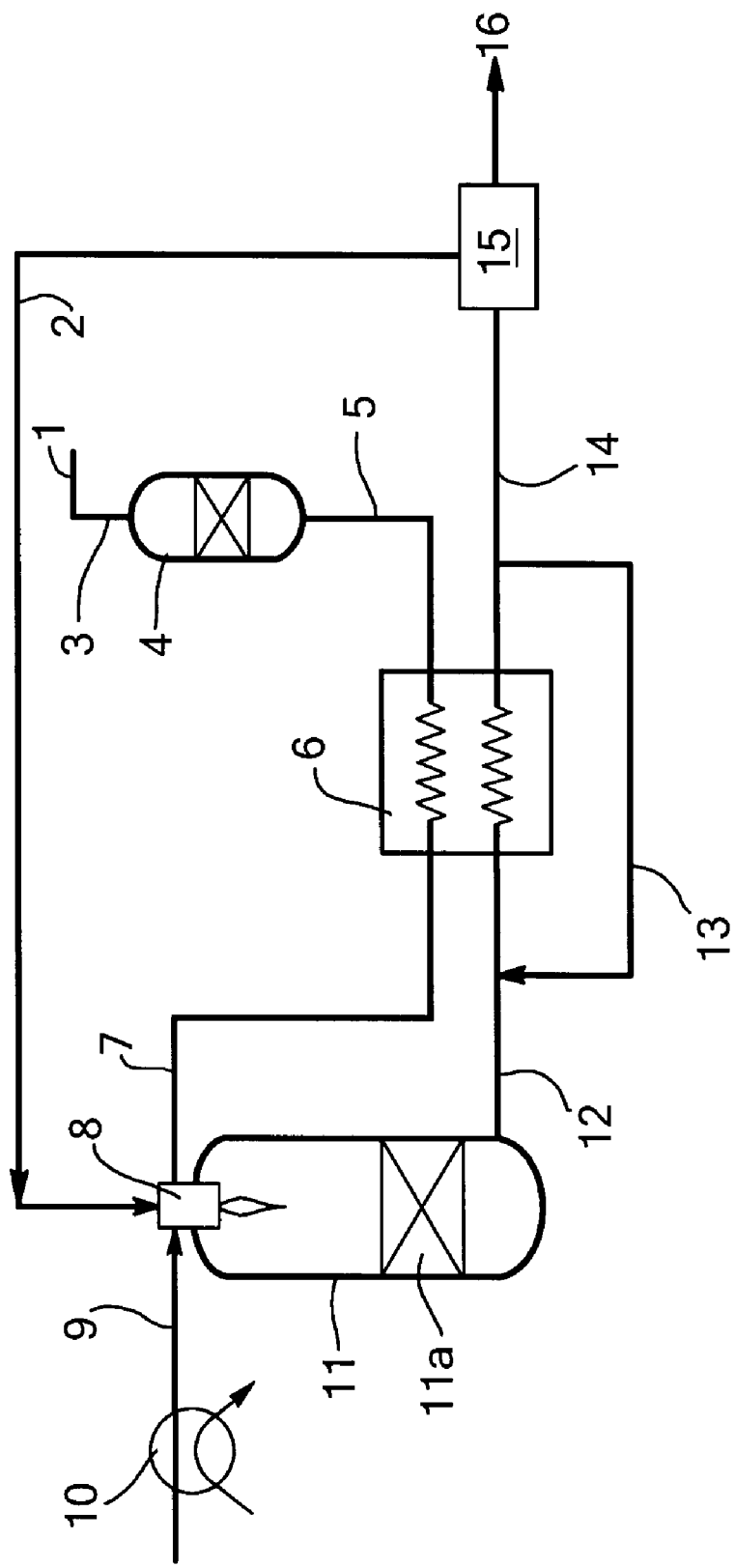
FIG. 1 is a schematic illustration of one embodiment of the invention.

Applicants found that the consumption of oxygen required in the synthesis gas manufacturing process is reduced when the partial oxidation is performed with a pre-heated feed as claimed. By performing the partial oxidation in the multi-orifice burner as described above damage to the burner is avoided. In addition applicants found that in some embodiments the production of carbon dioxide is reduced. Less production of carbon dioxide is advantageous because it increases the feed to synthesis carbon efficiency and may improve the yield (productivity) and selectivity of downstream processes, which use the synthesis gas as feedstock.

In a preferred embodiment the secondary gas has a temperature of at least 10° C. below the auto ignition temperature of the secondary gas. The auto-ignition temperature of the secondary gas is determined by the lowest auto-ignition temperature of one of the main gaseous components, wherein main gaseous components are components that are present for at least 5 vol. %. In case the secondary gas contains trace gas components having a content of below 5 vol % and having an auto-ignition temperature lower than the auto-ignition temperature of the main components, then the auto-ignition is determined as follows: The trace components are accumulated starting with the component having the lowest auto-ignition. When the total vol % of the accumulated trace gasses reaches 5 vol % the auto-ignition temperature of the last trace gas added determines the auto-ignition temperature of the secondary gas provided this last auto-ignition temperature is still below the lowest auto-ignition of the main components. Auto-ignition temperatures for some illustrative gaseous components are provided in the below table. Auto-ignition temperatures of other gasses can be measured using ASTM E-659-75.

| Component | Auto-ignition temperature in ° C.* |
|---|---|
| Methane | 540 |
| Ethane | 515 |
| Propane | 450 |
| Carbon monoxide | 652 |
| Hydrogen | 400 |

*Source: Basisgegevens aardgassen, N.V. Nederlandsche Gas Unie, 1980, Groningen.

The secondary gas comprises hydrogen or carbon monoxide or a hydrocarbon or any of their combinations. An example of a suitable secondary gas is natural gas. Preferably the secondary gas comprises hydrogen and carbon monoxide and a hydrocarbon. Such a gas is preferred because it will further enhance the efficiency of the process. The hydrocarbon is suitably a gaseous hydrocarbons, such as methane, ethane and propane, preferably methane. Examples of such gasses are natural gas, associated gas, coal bed methane and refinery off-gasses. The secondary gas may also comprise carbon monoxide and hydrogen. Preferably the secondary gas is a gaseous mixture comprising a hydrocarbon and between 5 and 30 mol % carbon monoxide and between 5 and 30 mol % hydrogen. The temperature of this secondary gas is preferably below 390° C. and even more preferably below 250° C. An example of a preferred secondary gas having such a composition is gaseous off-gas of a Fischer-Tropsch synthesis process. More preferably the Fischer-Tropsch process uses the synthesis gas as obtained by the process according to the present invention. Another suitable secondary gas is the gaseous off-gas of a methanol synthesis process. More preferably the methanol synthesis process uses the synthesis gas as obtained by the process according to the present invention.

Preferably the temperature of the oxidizer gas is greater than 200° C. More preferably the temperature is 20° C. below the auto ignition temperature of the secondary gas. The oxygen containing gas may be air (containing about 21 percent of oxygen) and preferably oxygen enriched air, suitably containing up to 100 percent of oxygen, preferably containing at least 60 volume percent oxygen, more preferably at least 80 volume percent, more preferably at least 98 volume percent of oxygen, such as 99.5 volume percent. Oxygen enriched air may be produced via cryogenic techniques, or alternatively by a membrane based process, e.g. the process as described in WO 93/06041.

The process according to the present invention uses a methane comprising feed. The feed may also comprise ethane and optionally hydrocarbons having more than 2 carbon atoms. Examples of such gaseous mixtures are natural gas, refinery gas, associated gas or coal bed methane and the like. The gaseous mixture suitably comprises mainly, i.e. more than 90 v/v %, especially more than 94%, $C_{1-4}$ hydrocarbons, especially comprises at least 60 v/v percent methane, preferably at least 75 volume percent, more preferably at least 90 volume percent. Preferably natural gas or associated gas is used.

The temperature of the methane comprising feed is above 500° C., preferably above 650° C., more preferably above 700° C. and even more preferably to between 750 and 900° C. The methane comprising feed may be heated to said temperatures by various methods. Preferably heating may be effected by indirect heat exchange with hot gasses in for example a fired heater. In another preferred embodiment heating is effected by indirect heat exchange between the effluent of the process according to the present invention and the methane comprising gas. This indirect heat exchange may be effected in for example a shell-tube heat exchanger, in a plate-fin heat exchanger or a fluidized bed type heat-exchanger. Fluidized bed type heater-exchanger is preferred in a situation wherein the effluent of the partial oxidation has a temperature of above 1000° C. By using a fluidized bed heat-exchanger the hot gas is quenched by the high solids loading of the fluidized bed, acting as a moving intermediate between effluent and feed. Preferably the effluent of the partial oxidation is first reduced in temperature, if required, to a temperature below 1000° C., more preferably between 850 and 950° C., before using said gas in said heat exchanger. The temperature of the effluent of the partial oxidation may be too high for direct use in said heat exchange step, due to for example mechanical limitations of the equipment or cracking of the feed resulting in fouling. In such cases it is preferred to reduce the temperature by quenching, for example with water or with part of the synthesis gas as prepared by the process of the invention, which gas has a lower temperature, preferably below 300° C. Alternatively the temperature can be reduced by indirect heat exchange against boiling water as for example in a waste heat boiler as for example described in WO-A-2005015105, U.S. Pat. No. 4,245,696 and EP-A-774103. Combinations of the foresaid methods may also be applied to reduce the temperature. A further possible method for reducing the temperature is by cooling only part of the effluent of the partial oxidation in for example the above referred to waste heat boiler, and combining the non-cooled effluent of the partial oxidation and the cooled effluent to obtain a gas mixture having the required temperature for use in said heat exchange step. By controlling the ratio between the effluent, which is cooled, and which bypasses the cooling step the temperature of the gas mixture can be controlled.

Another and sometimes preferred method of achieving an effluent of the partial oxidation having a temperature suited for performing the preferred heat exchange is by performing the partial oxidation step in the presence of a catalyst. Typically the partial oxidation process is performed in the absence of a catalyst. However by positioning, for example in the lower end of the vertical oriented gasification reactor, a bed of suitable reforming catalyst, conditions are created which yield an effluent having a much lower temperature. Such an embodiment will suitably yield an effluent having a temperature between 500 and 1100° C., which is much more in line with the preferred values for use of said heat exchange. Examples of such partial oxidation steps involving a reformer catalyst bed are described in FIG. 4 of WO-A-2004092060, which document is hereby incorporated by reference.

For methane comprising feeds, which comprise in addition to methane, an amount of ethane and higher C-number hydrocarbons, it is preferred to pre-treat the feed to the present process in a so-called pre-reforming process. This is advantageous to avoid cracking of the ethane and higher carbon number hydrocarbons at the elevated temperatures of the methane comprising feed.

Pre-reforming is a well-known technique and has been applied for many years in for example the manufacture of so-called city gas. Suitably the pre-reforming step is performed as a low temperature adiabatic steam reforming process. The gaseous feed to the pre-reforming is preferably mixed with a small amount of steam and preheated to a temperature suitably in the range 350-700° C., preferably between 350 and 530° C. and passed over a low temperature steam reforming catalyst having preferably a steam reforming activity at temperatures of below 650° C., more preferably below 550° C. The pressure at which the pre-reforming is employed is preferably between 20 and 70 bars. Preferably the pressure is about in the same range as the pressure at which the partial oxidation is performed. The steam to carbon (as hydrocarbon and CO) molar ratio is preferably below 1 and more preferably between 0.1 and 1.

Suitable catalysts for the low temperature steam pre-reforming are catalysts comprising an oxidic support material, suitably alumina, and a metal of the group consisting of Pt, Ni, Ru, Ir, Pd and Co. Examples of suitable catalysts are nickel on alumina catalyst as for example the commercially available pre-reforming catalysts from Johnson Matthey, Haldor Topsoe, BASF and Sued Chemie or the ruthenium on alumina catalyst as the commercially available catalyst from Osaka Gas Engineering.

Pre-reforming is preferably performed adiabatically. Thus the gaseous feedstock and steam are heated to the desired inlet temperature and passed through a bed of the catalyst. Higher hydrocarbons having 2 or more carbon atoms will react with steam to give carbon oxides and hydrogen. At the same time methanation of the carbon oxides with the hydrogen takes place to form methane. The net result is that the higher hydrocarbons are converted to methane with the formation of some hydrogen and carbon oxides. Some endothermic reforming of methane may also take place, but since the equilibrium at such low temperatures lies well in favour of the formation of methane, the amount of such methane reforming is small so that the product from this stage is a methane-rich gas. The heat required for the reforming of higher hydrocarbons is provided by heat from the exothermic methanation of carbon oxides (formed by the steam reforming of methane and higher hydrocarbons) and/or from the sensible heat of the feedstock and steam fed to the catalyst bed. The exit temperature will therefore be determined by the temperature and composition of the feedstock/steam mixture and may be above or below the inlet temperature. The conditions should be selected such that the exit temperature is lower than the limit set by the de-activation of the catalyst. While some reformer catalysts commonly used are deactivated at temperatures above about 550° C., other catalysts that may be employed can tolerate temperatures up to about 700° C. Preferably the outlet temperature is between 350 and 530° C.

The invention is thus also directed to a process wherein the methane comprising gas is prepared from a gaseous mixture of hydrocarbons comprising methane, ethane and optional higher carbon number hydrocarbons by performing the following steps (a) pre-reforming the hydrocarbon mixture in the presence of a suitable reforming catalyst and steam to convert ethane, and the optional higher carbon number hydrocarbons to methane, carbon dioxide and hydrogen, and (b) heating the gaseous mixture obtained in step (a) to the temperature of the methane comprising gas used in the partial oxidation.

Preferably any sulphur in the methane comprising feed is removed prior to performing the partial oxidation or the optional pre-reforming of said feed. Sulphur is removed to levels of below 10 ppm, preferably below 0.1 ppm. At high-sulphur feed levels the removal of sulphur is suitably performed by contacting the natural gas with a liquid mixture which contains a physical and a chemical absorbent. In such a process the gas mixture is treated at super-atmospheric pressure in two steps consecutively with two different liquid mixtures which contain a physical absorbent and a chemical absorbent. In the first step, $H_2S$ is selectively removed with respect to $CO_2$, and in the second step, the remaining acid gases are virtually completely removed. An example of a suitable process is the so-called sulfolane extraction process. In addition to such removal, or at low-sulphur feed levels, small amounts of sulphur may also be removed by passing the gaseous feedstock through a bed of a suitable absorbent, for example zinc oxide, to absorb any hydrogen sulphide present. Often the absorbent is preceded by a hydrogenation reactor to convert organic sulphur compounds to hydrogen sulphide.

In the partial oxidation process the feed is contacted with the oxygen containing gas in a multi-orifice burner placed at the top of a vertically oriented reactor vessel. The multi-orifice burner is provided with an arrangement of separate passages, wherein the methane comprising feed flows through a passage of the burner, the oxidizer gas flows through a separate passage of the burner and wherein the passage for the methane comprising feed and the passage for oxidizer gas are separated by a passage through which the secondary gas flows. Preferably the exit velocity of the oxidizer gas is greater than the exit velocity of the secondary gas. Preferably the exit velocity of the methane comprising feed is between 10 and 70 m/s and more preferably between 20 and 60 m/s. The exit velocity of the secondary gas is preferably between 10 and 70 m/s, more preferably between 20 and 60 m/s. The exit velocity of the oxidizer gas is preferably between 60 and 150 m/s, more preferably between 70 and 100 m/s. The respective velocities are measured or calculated at the outlet of the said respective channels into the gasification zone.

The multi-orifice burner may preferably have 2N+1 passages. Preferably N is 1 to 6. Most preferably N is 1. The advantages of the invention may also be achieved with arrangements having even higher number of passages. Preferably the burner is a burner having three passages (N=1), namely a preferably central passage for the oxidizer gas, a passage for the methane comprising feed and a passage for secondary gas separating the before mentioned two passages. Preferably such a three-passage burner is a co-annular burner. Preferably the centre passage for the oxidizer gas flow is divided into two passages for oxidizer gas flow being (i) an annular passage for oxidizer gas flow and a (ii) centre passage for oxidizer gas wherein through the annular passage the velocity of the oxidizer gas flow is between 60 and 150 m/s, more preferably between 70 and 100 m/s. It is found that a more stable flame is obtained by having the high velocity oxidizer flow exit the burner via an annular-formed passage.

Alternatively N may be from 2 to 6, in case the mixing efficiency is to be increased. Such a burner having more passages preferably consists of a main tubular passage for methane comprising feed and N co-annular arrangements that are feeding oxidizer gas via its centre passage and secondary gas via its annular passage, both positioned within and parallel with the axis of the main tubular passage. The above-described burner may be position at the top of a reactor and firing downwardly or be positioned at the side wall of a reactor vessel and firing substantially in a horizontal direction. The number of burners may vary from 1 to 8 per gasification reactor. In the latter embodiment, with more than one burner, burners preferably fire as opposed pairs. More preferably the burners are directed such that some swirling motion within the reactor vessel results.

The gaseous product of the partial oxidation reaction preferably has a temperature of between 1000 and 1500° C., more preferably between 1200 and 1400° C. and an $H_2/CO$ molar ratio of from 1.5 up to 2.6, preferably from 1.6 up to 2.2.

The effluent of the partial oxidation is preferably reduced in temperature in a so-called waste heat boiler as for example described in WO-A-2005015105, U.S. Pat. No. 4,245,696 and EP-A-774103. In such a waste heat boiler water evaporates and steam and even super heated steam is prepared. Such steam may find attractive use for power generation and the like. Part of said steam may advantageously be used in the optional pre-reforming as described above. The mixture of carbon monoxide and hydrogen as cooled in the waste heat boiler will preferably have a temperature of between 400 and 500° C. Preferably this stream is used to increase the temperature by means of indirect heat exchange of especially the natural gas feed upstream the sulphur removal step to a temperature of between 300 and 450° C. The mixture of carbon monoxide and hydrogen is preferably cooled to a temperature of below the dewpoint to achieve maximal heat recovery after which the fluid can be fed to a water scrubber in which advantageously soot is removed.

As described above the secondary gas is preferably an off-gas from a downstream process, which uses the synthesis gas as, prepared in the partial oxidation as feed. The downstream process is for instance a Fischer-Tropsch process or a methanol process.

The invention is in particular directed to the following process to prepare methanol by preparing a synthesis gas according to the partial oxidation process as described above, reacting the synthesis gas into methanol via a methanol forming reaction whereby also a methanol off-gas is produced; separating the methanol and methanol off-gas and using the methanol off-gas as secondary gas in the above described process. In a preferred embodiment the methanol off-gas, which contains hydrogen, is processed in a hydrogen purification process to obtain a hydrogen rich mixture and a hydrogen poor mixture. The hydrogen rich mixture is preferably mixed with the synthesis gas and the resulting mixture is used as feed for the methanol forming reaction. The hydrogen poor mixture is suitably used as secondary gas. Possible hydrogen purification processes are membrane separation processes, pressure swing absorber processes or combinations of said processes. Methanol processes are well known and described in for example EP-A-111376 and WO-A-2005/108336.

The invention is also in particular directed to the following process to prepare a Fischer-Tropsch synthesis product by preparing a synthesis gas according to the partial oxidation process as described above, reacting the synthesis gas in a Fischer-Tropsch synthesis reaction to a Fischer-Tropsch synthesis product, whereby also a Fischer-Tropsch off-gas (F-T off-gas) is produced; separating the Fischer-Tropsch synthesis product and the F-T off-gas and using the F-T off-gas as secondary gas in the above described process. Fischer-Tropsch processes are well known and for example described in the earlier referred to GB-A-2183672 and in WO-A-02/38699.

In a Fischer-Tropsch synthesis the synthesis gas is used as feedstock and the synthesis is suitably performed in one or more steps wherein the mixture of hydrogen and carbon monoxide are at least partly converted into liquid hydrocarbons in the presence of a Fischer Tropsch type catalyst. This catalyst preferably comprises at least one metal (compound) selected from group 8 of the Periodic Table. Preferred catalytic metals are iron and cobalt, especially cobalt. It is preferred to produce a very heavy product in the Fischer-Tropsch synthesis. This results in a relatively low amount of off-gas, resulting in a higher carbon efficiency. Large amounts of heavy products may be produced by catalysts which are known in the literature (e.g. vanadium or manganese promoted cobalt catalysts) under suitable conditions, i.e. relatively low temperatures and relatively low $H_2$/CO ratios. Any hydrocarbons produced in the Fischer-Tropsch synthesis boiling above the middle distillate boiling range may be converted into middle distillates by means of hydrocracking/hydroisomerization. Such a step will also result in the hydrogenation of the product as well as in (partial) isomerization of the product.

The Fischer Tropsch synthesis is, as indicated above, preferably carried out with a catalyst producing large amounts of unbranched paraffinic hydrocarbons boiling above the middle distillate range. Relatively small amounts of oxygen containing compounds are produced. The process is suitably carried out at a temperature of 150 to 300° C., preferably 190 to 260° C., and a pressure from 20 to 100 bar, preferably from 30 to 70 bar.

In the hydrocracking/hydroisomerization process preferably at least the fraction boiling above the middle distillate boiling range is hydrocracked and hydroisomerized into middle distillate fractions having a lower carbon number and having a higher content of branched paraffins than the feed to said hydrocracker. Preferably all $C_5$+, especially all $C_{10}$+ hydrocarbons are hydrocracked/hydroisomerized in view of the improved pour point of the middle distillate fuels, suitably gas oil, obtained in such a process. Suitable hydrocracking/hydroisomerization processes are described in for example WO-A-200014179, EP-A-532118 and EP-A-776959. In said hydrocracking/hydroisomerization process an off-gas comprising hydrogen and $C_1$-$C_3$ hydrocarbons will be separated from the effluent of the hydrocracking/hydroisomerization step. This off-gas may find use as fuel for the optional fired heater, as additional feed to the optional pre-reformer or as secondary gas. In a preferred embodiment the off-gas is used in the Fischer-Tropsch synthesis. The present invention is also directed to a process to prepare the products which are obtained when hydroprocessing the Fischer-Tropsch synthesis product.

The product stream obtained in the Fischer-Tropsch synthesis is separated into a relatively light stream and a relatively heavy stream. The relatively light stream (off gas) comprises mainly unconverted synthesis gas, inerts, carbon dioxide and the $C_1$-$C_4$ hydrocarbons, preferably $C_1$-$C_3$ hydrocarbons. According to the present invention all or part of this off-gas is used as secondary gas. Preferably at least a small bleed stream is not recycled to the above process in order to avoid a build-up of inerts in the recirculating gas mixture. An example of an effective use of such a bleed stream is by using part of the light stream as fuel for the optional fired heater as described above for a preferred embodiment of the present invention.

FIG. 1 shows an embodiment of the process according to the present invention. Natural gas (1) and steam is fed as Feed (3) to a pre-reformer reactor (4) and a pre-reformed effluent (5) is obtained. This effluent (5) is increased in temperature in heat exchanger (6) against the effluent (12) of a partial oxidation reactor (11). Heated pre-reformed mixture (7) is subjected to a partial oxidation in a burner (8) with oxygen (9) and a gaseous by-products stream (2) from a downstream process (15) as secondary gas. The burner (8) is part of a partial oxidation reactor (11). Oxygen (9) is preferably heated in heat exchanger (10). The partial oxidation reactor (11) may be optionally provided with a bed of reforming catalyst (11a). To cool the effluent before use in heat exchanger (6) effluent (12) is cooled by quenching by mixing with part of the cooled product gas (13). Other methods for cooling as described above may also be suitably applied. The resultant mixture of hydrogen and carbon monoxide (14) is used in downstream process (15). From the paraffinic waxy production (16) a gaseous by-product stream (2) is recovered and recycled to burner (8). Downstream process (15) in FIG. 1 is suitably a Fischer-Tropsch synthesis or a methanol synthesis.

Figure 2:
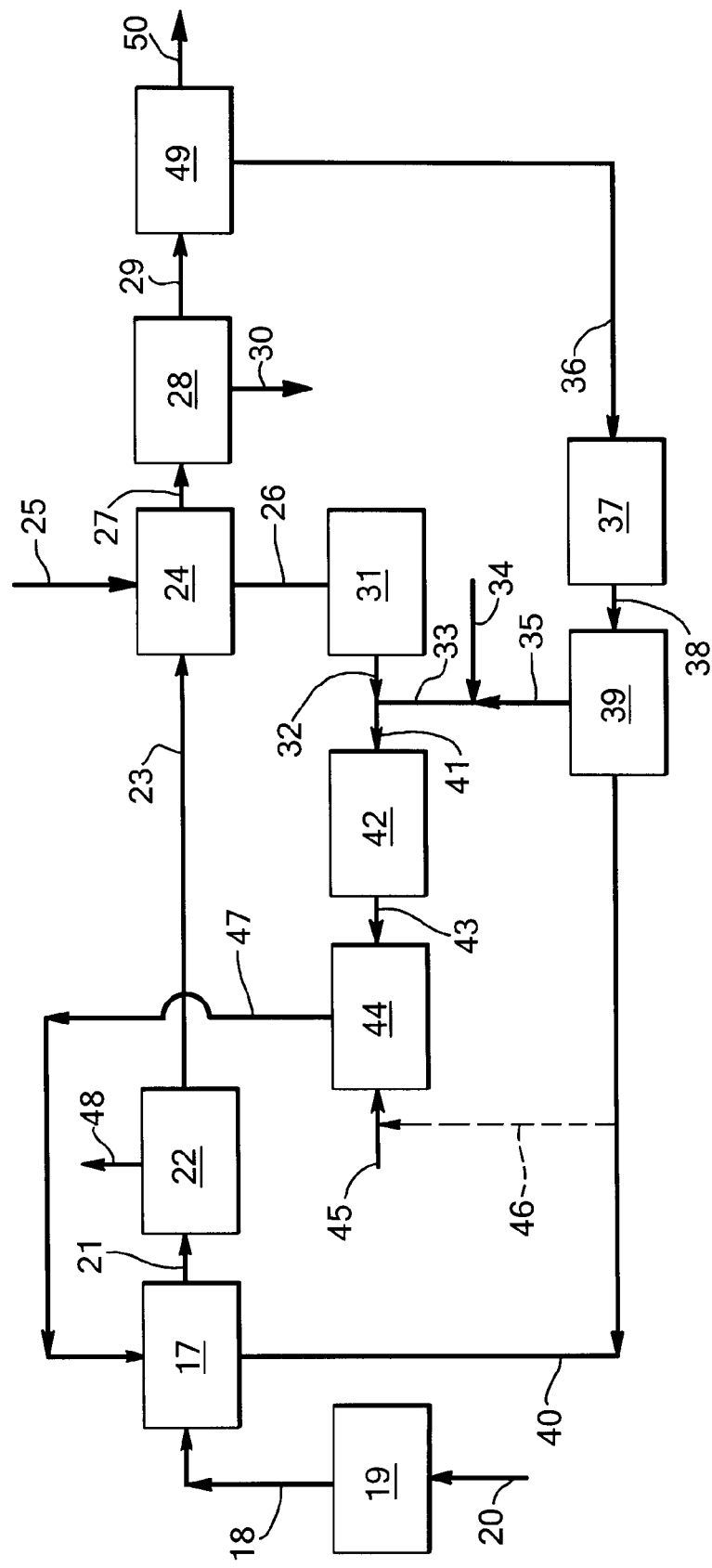
FIG. 2 is a schematic illustration of a second embodiment of the invention.

FIG. 2 shows another preferred embodiment of the present invention. A partial oxidation reactor (17) is fed with pre-heated oxygen (18) and a pre-reformed mixture (47) to obtain a product gas (21). The pre-heated oxygen (18) is obtained by heating oxygen (20) in a oxygen preheater (19). The product gas (21), comprising hydrogen and carbon monoxide is reduced in temperature in a heat exchanger (22) against water to obtain steam (48), more preferably super heated steam. Heat exchanger (22) is also referred to as a waste heat boiler as for example described in the earlier referred to WO-A-2005015105, U.S. Pat. No. 4,245,696 and EP-A-774103. The conduits for passage of the product gas (21) in heat exchanger (22) are preferably made of a nickel based metal alloy to avoid metal dusting. An example of a suitable metal alloy is Alloy 693 as obtainable from Special Metals Corporation, USA. The partially cooled product gas (23) having a temperature of preferably between 420 and 450° C. is used in heat exchanger (24) to increase the temperature of natural gas (25) to a heated natural gas stream (26) having a temperature of about 380° C. The product gas (27) having a temperature of below the dewpoint or slightly above is fed to a scrubber (28) to remove any residual soot formed in partial oxidation reactor (17) and recover a cleaned product gas (29) and waste water (30). The product gas (29) is provided to a downstream process (49) yielding a product (50) and a light stream (36). Sulphur is removed from the pre-heated natural gas (26) in sulphur removal unit (31). The sulphur poor natural gas (32) is mixed with high-pressure steam (34) to obtain a mixture (41), which in turn is used as feed to pre-reformer reactor (42). The effluent (43) of pre-reformer reactor (42) having a temperature of suitably between 370 and 480° C. is increased in temperature in feed pre-heater (44). The pre-reformed and pre-heated mixture (47) has a temperature of suitably between 650 and 800° C. Pre-heater (44) is suitably a fired heater, which is a furnace, which is fuelled with a suitable combustion gas and air mixture (45). Suitable combustion gasses are fuel gas, natural gas or the light stream as obtained from the Fischer-Tropsch synthesis step (36) directly or after pressurization as stream (46).

FIG. 2 also shows light stream (36) as obtained from a downstream process (49). This gaseous stream (36) is increased in pressure in compressor (37) to a pressure level of the partial oxidation reactor (17) to be used as secondary gas (40). The pressurized stream (38) is optionally increased in temperature in pre-heater (39). The pre-heated stream is directly fed to the burner(s) of the partial oxidation reactor

(17) via stream (40) and optionally also to pre-reformer reactor (42). Optionally a remainder of this light stream may be used as fuel (46) in Furnace (44).

Downstream process (49) in FIG. 2 is suitably a Fischer-Tropsch synthesis or a methanol synthesis.

The invention claimed is:

1. A process to prepare a synthesis gas comprising hydrogen and carbon monoxide, said process comprising:
   performing a partial oxidation using a multi-orifice burner provided with an arrangement of separate passages, wherein a gaseous hydrocarbon feed comprising methane and having a temperature above 500° C. flows through a passage of the burner, an oxidizer gas flows through a separate passage of the burner and
   wherein the passage for gaseous hydrocarbon feed and the passage for oxidizer gas are separated by a passage through which a secondary gas flows, wherein the secondary gas comprises hydrogen, carbon monoxide and/or a hydrocarbon.

2. The process according to claim 1, wherein the temperature of the secondary gas is lower than the auto ignition temperature of the secondary gas minus 10° C.

3. The process according to claim 1, wherein the temperature of the oxidizer gas is lower than the auto ignition temperature of the secondary gas minus 20° C.

4. The process according to claim 1, wherein the methane comprising feed has a temperature above 650° C.

5. The process according to claim 4, wherein the methane comprising feed has a temperature above 700° C.

6. The process according to claim 5, wherein the methane comprising feed has a temperature between 750 and 900° C.

7. The process according to claim 1, wherein the exit velocity of the oxidizer gas is greater than the exit velocity of the secondary gas.

8. The process according to claim 1, wherein the multi-orifice burner is a burner having a central passage for the oxidizer gas, a passage for the methane comprising feed and a passage for secondary gas separating the before mentioned two passages.

9. The process according to claim 8, wherein the central passage for the oxidizer gas flow is divided into two passages for oxidizer gas being (i) an annular passage for oxidizer gas and (ii) a center passage for oxidizer gas wherein through the annular passage the velocity of the oxidizer gas is between 60 and 150 m/s.

10. The process according to claim 1, wherein the secondary gas comprises methane.

11. The process according to claim 1, wherein the secondary gas is a gaseous mixture comprising a hydrocarbon and between 5 and 30 mol % carbon monoxide and between 5 and 30 mol % hydrogen.

12. The process according to claim 10, wherein the secondary gas is obtained from the gaseous by-products of a Fischer-Tropsch synthesis process.

13. The process according to claim 10, wherein the secondary gas is obtained from the gaseous by-products of a methanol synthesis process.

14. The process according to claim 11, wherein the temperature of the secondary gas is below 390° C.

15. The process according to claim 14, wherein the temperature of the secondary gas is below 250° C.

16. The process according to claim 1, wherein the feed is prepared from a gaseous mixture of hydrocarbons comprising methane, ethane and optional higher carbon number hydrocarbons by performing the following steps:
   (a) pre-reforming the hydrocarbon mixture in the presence of a reforming catalyst and steam to convert ethane, and the optional higher carbon number hydrocarbons to methane, carbon dioxide and hydrogen, and
   (b) heating the gaseous mixture obtained in step (a) to the temperature of the feed used in the partial oxidation.

17. The process according to claim 16, wherein the temperature of the gas as obtained in step (a) is between 350 and 530° C.

18. The process according to claim 16, wherein the steam to carbon (as hydrocarbon and CO) molar ratio of the feed to step (a) is below 1.

19. The process according to claim 18, wherein the steam to carbon (as hydrocarbon and CO) molar ratio of the feed to step (a) is between 0.1 and 1.

20. The process according to claim 1, wherein the temperature of the synthesis gas is between 1000 and 1500° C. and the $H_2/CO$ molar ratio of the synthesis gas is from 1.6 to 2.2.

21. A process to prepare methanol by preparing a synthesis gas according to the process of claim 1, reacting the synthesis gas into methanol via a methanol forming reaction whereby a methanol off-gas is produced; separating the methanol and methanol off-gas and using the methanol off-gas as secondary gas in the process of claim 1.

22. A process to prepare a Fischer-Tropsch synthesis product by preparing a synthesis gas according to the process of claim 1, reacting the synthesis gas in a Fischer-Tropsch synthesis reaction to a Fischer-Tropsch synthesis product, whereby a Fischer-Tropsch off-gas (F-T off-gas) is produced; separating the Fischer-Tropsch synthesis product and the F-T off-gas and using the F-T off-gas as secondary gas in the process according to claim 1.

23. The process according to claim 22, wherein a middle distillate fuel is prepared from the Fischer-Tropsch synthesis product by subjecting the Fischer-Tropsch synthesis product to a hydrocracking/hydroisomerization process.

* * * * *